United States Patent [19]

Bartfield et al.

[11] Patent Number: 4,646,627
[45] Date of Patent: Mar. 3, 1987

[54] APPARATUS FOR PREPARING FRIED POTATO PRODUCTS

[75] Inventors: William Bartfield, Sherman Oaks, Calif.; Charles L. Ferguson, Deerfield, N.H.

[73] Assignee: Prize Frize, Inc., Palm Springs, Calif.

[21] Appl. No.: 728,208

[22] Filed: Apr. 29, 1985

Related U.S. Application Data

[60] Continuation-in-part of Ser. No. 593,584, Mar. 26, 1984, Pat. No. 4,540,588, which is a division of Ser. No. 352,579, Feb. 26, 1982, Pat. No. 4,438,683.

[51] Int. Cl.⁴ ............................................. A47J 37/12
[52] U.S. Cl. ...................... 99/330; 99/353; 99/356; 99/357; 99/404; 99/407; 222/372; 426/438; 426/509; 426/516
[58] Field of Search .............. 99/330, 335, 353, 355, 99/356, 357, 403, 404, 405, 406, 407, 408, 443 C, 483, 430, 536; 426/231, 429, 430, 431, 441, 509, 512, 513, 518, 438, 516; 222/372

[56] References Cited

U.S. PATENT DOCUMENTS

| 2,026,003 | 12/1935 | Sharp . |
| 2,869,475 | 1/1959 | Bobo . |
| 3,021,224 | 2/1962 | Stagmeier . |
| 3,039,883 | 6/1962 | Kodras . |
| 3,063,849 | 11/1962 | Nelson et al. . |
| 3,063,849 | 11/1962 | Nelson et al. . |
| 3,085,020 | 4/1963 | Backinger et al. . |
| 3,124,122 | 3/1964 | Baron ........................... 99/406 X |
| 3,260,607 | 7/1966 | Asselbergs et al. . |
| 3,280,723 | 10/1966 | Hughes et al. ................. 99/353 |
| 3,282,704 | 11/1966 | Fritzberg . |
| 3,297,450 | 1/1967 | Loska, Jr. . |
| 3,338,724 | 8/1967 | Adler et al. . |
| 3,347,425 | 10/1967 | Beushausen et al. . |
| 3,396,036 | 8/1968 | Liepa . |
| 3,407,080 | 10/1968 | Rainwater et al. . |
| 3,448,677 | 6/1969 | Dexters ......................... 99/336 |
| 3,457,088 | 7/1969 | Beck . |
| 3,458,325 | 7/1969 | Beck . |
| 3,459,141 | 8/1969 | Keil . |
| 3,468,354 | 9/1969 | Reachert . |
| 3,468,673 | 9/1969 | Keller . |
| 3,605,647 | 9/1971 | Beck et al. . |
| 3,622,355 | 11/1971 | Beck et al. . |
| 3,634,105 | 1/1972 | Beck et al. . |
| 3,645,196 | 2/1972 | Johnston et al. .............. 99/404 |
| 3,685,432 | 8/1972 | Hoeberigs ..................... 99/357 |

List Continued on next page.

FOREIGN PATENT DOCUMENTS 2000417 12/1971 Fed. Rep. of Germany .
1308782 3/1973 United Kingdom .

Primary Examiner—Billy J. Wilhite
Attorney, Agent, or Firm—Fleit, Jacobson, Cohn & Price

[57] ABSTRACT

Apparatus and method for preparing hot food products in portions of predetermined size by rehydrating a dehydrated food product to provide a dough that can be shaped and heated. The apparatus includes means for storing bags of dehydrated product and for opening individual bags as needed to maintain a desired level of dehydrated product in a hopper. Rehydration means are provided, including a metering chamber to meter a portion of the dehydrated food product, and a rehydration head to uniformly wet the dehydrated food product to form a coherent dough. The dough is passed through a forming means to form it into predetermined pieces that are extruded from a forming chamber, and a wire knife passes linearly across the forming chamber to separate the extruded product therefrom. A product transfer conveyor is provided to convey the shaped dough pieces to a fryer vessel in which heated frying oil is provided. The fryer vessel is evacuated when the fryer is not in use, and a recirculation system is provided to periodically recirculate heated frying oil to the frying vessel to maintain it at an elevated temperature and ready for use. The resulting product has a desirable texture, taste, and appearance.

30 Claims, 26 Drawing Figures

U.S. PATENT DOCUMENTS

| | | | |
|---|---|---|---|
| 3,690,247 | 9/1972 | Van Cleven et al. | 99/355 |
| 3,703,246 | 11/1972 | Horak | 222/17 |
| 3,764,345 | 10/1973 | Beck et al. | 426/506 |
| 3,771,937 | 11/1973 | Harmon et al. | 425/161 |
| 3,782,969 | 1/1974 | Beck et al. | |
| 3,789,750 | 2/1974 | Beck et al. | 99/536 |
| 3,809,758 | 5/1974 | Mathias et al. | 426/285 |
| 3,818,820 | 6/1974 | Harris et al. | 99/407 |
| 3,885,056 | 5/1975 | Smith et al. | 426/441 |
| 3,890,453 | 6/1975 | Harmon et al. | 426/503 |
| 3,896,715 | 7/1975 | Mascret | 99/356 |
| 3,908,111 | 9/1975 | Du Bois et al. | 219/442 |
| 3,968,265 | 7/1976 | Shatila et al. | 426/550 |
| 3,975,549 | 8/1976 | Shatila et al. | 426/550 |
| 3,987,210 | 10/1976 | Cremer | 426/550 |
| 3,988,484 | 10/1976 | Shatila | 426/99 |
| 3,997,684 | 12/1976 | Willard | 426/550 |
| 4,005,139 | 1/1977 | Kortschot et al. | 426/550 |
| 4,007,292 | 2/1977 | Shatila et al. | 426/637 |
| 4,044,163 | 8/1977 | Shatila et al. | 426/502 |
| 4,056,345 | 11/1977 | Shatila et al. | 425/186 |
| 4,060,367 | 11/1977 | Shatila et al. | 425/311 |
| 4,082,855 | 4/1978 | Citti et al. | 426/250 |
| 4,096,791 | 6/1978 | Weiss et al | 99/353 |
| 4,109,012 | 8/1978 | Bates et al. | 426/302 |
| 4,198,437 | 4/1980 | Citti et al. | 426/104 |
| 4,221,842 | 9/1980 | Toft | 426/550 |
| 4,238,517 | 12/1980 | Bosley, Jr. et al. | 426/250 |
| 4,252,252 | 2/1981 | Gross et al. | 222/14 |
| 4,272,556 | 6/1981 | Shatila et al. | 426/453 |
| 4,293,582 | 10/1981 | Hamann et al. | 426/637 |
| 4,359,935 | 11/1982 | Murray | 99/331 |
| 4,392,420 | 7/1983 | Caridis | 99/406 |
| 4,488,478 | 12/1984 | Leeper | 99/408 |

APPARATUS FOR PREPARING FRIED POTATO PRODUCTS

CROSS-REFERENCE TO RELATED APPLICATION

This application is a continuation-in-part of co-pending application Ser. No. 593,584, filed Mar. 26, 1984, now U.S. Pat. No. 4,540,588 and entitled "APPARATUS AND METHOD FOR DISPENSING INDIVIDUAL ORDERS OF A HOT FOOD PRODUCT", which is a division of application Ser. No. 352,579, filed Feb. 26, 1982, now U.S. Pat. No. 4,438,683.

BACKGROUND OF THE INVENTION

This invention relates to an apparatus for preparing heated food products, and more particularly to an apparatus for preparing and dispensing individual portions of a fried potato product prepared from dehydrated potatoes that are rehydrated immediately prior to frying and dispensing. Various types of devices and methods have been disclosed for preparing hot food products from dehydrated food products that are reconstituted by adding water, formed, and then cooked or fried to provide the desired product. The co-pending application of which the present application is a continuation-in-part discloses an apparatus and a method for preparing a french fried potato product that is shaped from a dough prepared in the apparatus by rehydrating dehydrated potatoes. The dehydrated potatoes are reconstituted in situ to provide a dough that can be formed in the desired shape, and then fried and dispensed. The apparatus therein disclosed is an individual portion machine, which can also be used as a vending machine, to accomplish those purposes and to permit the preparation of fried potato products in restaurants, industrial and school cafeterias, and the like, as well as wherever vending machines are installed.

The present invention is an improvement over the apparatus disclosed in the parent application, and provides a product that closely resembles french fried potatoes that have been prepared by frying cut raw potatoes, the resemblance extending to the taste, the appearance, and the texture of the resulting product. In the method and apparatus disclosed in the parent application, it was necessary that a portion of a premixed potato patty be provided in a mixing chamber to serve as a base for the subsequently prepared dough, and it was therefore necessary that a portion of dough be retained in the apparatus for later use as a base after one or more orders had been processed and dispensed. Additionally, the apparatus and method of the parent application also involved the continuous heating of the frying oil in order to have the apparatus in condition for immediate preparation and dispensing of the desired product, and without requiring an unduly lengthy warm-up time. The present invention is directed to improvements in the apparatus and method disclosed in the parent application.

It is an object of the present invention to provide an apparatus for preparing and dispensing a fried food product in which each individual portion is separately prepared, and without the need for retaining reconstituted product as an intermediate product in the apparatus to serve as a base for the preparation of a subsequent portion.

It is another object of the present invention to provide an improved apparatus for preparing a fried food product in which deterioration of the frying oil is minimized.

It is a further object of the present invention to provide an apparatus in the form of a vending machine for preparing a fried food product for immediate dispensing.

It is still a further object of the present invention to provide an apparatus for preparing a fried food product for dispensing in a dispensing machine and in which product residues that remain after a dispensing operation are minimized in order to maintain high sanitation levels.

SUMMARY OF THE INVENTION

Briefly stated, in accordance with one aspect of the present invention, apparatus for preparing and dispensing a fried food product is described, the apparatus including means for storing individual bags of dehydrated product that can be opened as necessary depending upon the demand for the product, and in which the empty bags are retained for subsequent removal. A bag cutting device is provided to open the bag and to permit the product to fall into a product hopper. A product forming section is provided to reconstitute a measured portion of the dehydrated material to provide a dough that can be formed in the desired shape. The dough is formed into the shape of french fried potatoes and is thereafter fried in a fryer that contains hot frying oil. The fried product is then removed from the fryer and transported to a dispensing station where the product is dispensed in cup-like containers.

In accordance with another aspect of the present invention, a method is provided for preparing and dispensing a fried food product in which the product is formed from a dough prepared from dehydrated potatoes and water, the amount of the dough prepared being equal in volume to the volume of a single order of fried potatoes in order that no dough residue remains in the apparatus to eliminate sanitation problems. Any residue that does remain in the dough-forming portion of the apparatus is dried by means of heat in order to minimize the likelihood of biological contamination. Further, the method includes maintaining the oil in a closed system and at an elevated temperature, and periodically recycling the heated frying oil through the fryer vessel to maintain the fryer vessel at an elevated temperature and ready for immediate operation without the need for a time-consuming heating operation when an order is intended to be prepared and dispensed.

DESCRIPTION OF THE PREFERRED EMBODIMENTS

Figure 1:
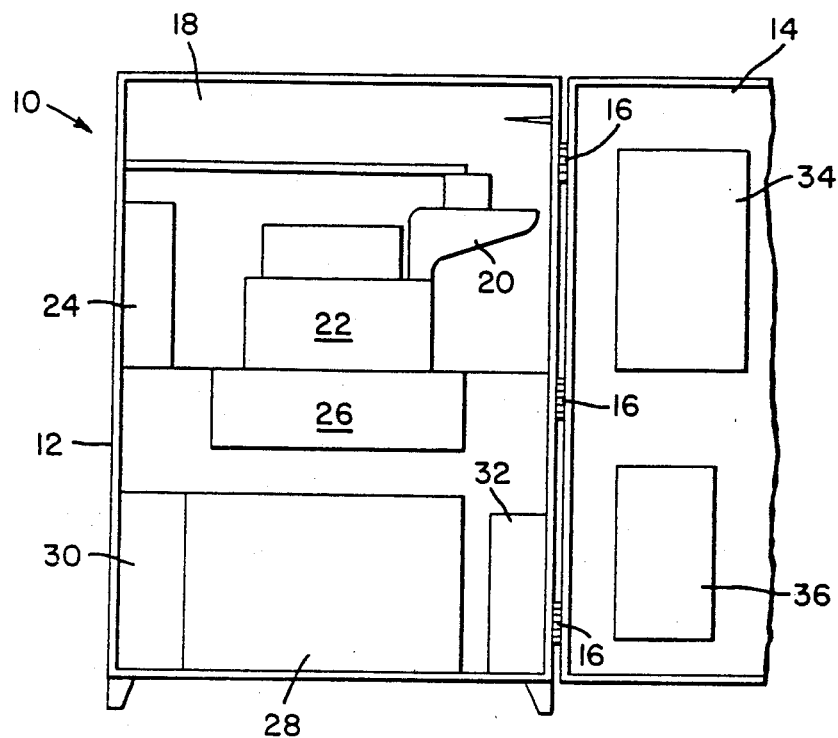
FIG. 1 is a front elevational view of a machine for preparing and dispensing individual portions of heated food products in accordance with the present invention showing the several parts thereof in their operative relationship, and with the door of the machine open and partially broken away to illustrate the components that are carried on the inside of the door structure.

Referring now to the drawings, and particularly to FIG. 1 thereof, there is shown a food product dispensing machine 10 that includes a cabinet 12, and a door 14 supported on hinges 16 carried by the cabinet 12. The cabinet includes a dehydrated product bag storage and transfer section 18 to receive bags of the dehydrated product and to transfer them to a bag cutter to permit the contents of a bag to be deposited into a hopper 20. A product forming section 22 is provided under hopper 20 and in which dehydrated potato product is metered into a suitable metering chamber, is rehydrated by adding a predetermined amount of water to the dehydrated potato product to form a dough, and is then formed into the desired product shape. Product forming section 22 includes drive apparatus that operates the various parts of the product forming section in a predetermined sequence. A power supply 24 provides the necessary electrical power for the various electrical components of the apparatus. A fryer section 26 is positioned below the product forming section and the formed product is fried to provide the desired heating and external appearance. The oil for the fryer is contained within a frying oil circulation system 28, and a frying oil supply 30 is provided to replace frying oil that remains on the product as it is dispensed and such frying oil that may vaporize during the frying operation. An air exhaust system 32 is provided to draw the oil fumes from the cabinet.

The door 14 to cabinet 12 includes on the inner surface thereof a cup storage and dispensing section 34 for product containers in which the product is furnished to the purchaser. Additionally, a control cabinet 36 is provided to house the electronic circuitry, circuit boards, microprocessors, and the like that can be employed to control the operation of the various portions of the apparatus.

The raw material that is preferred for use in the apparatus and method of the present invention is a dehydrated potato product provided in agglomerated form and which is capable of reconstitution into a formable dough without the need for mechanical mixing of dehydrated potatoes and water. Products of that type are described in U.S. Pat. No. 3,809,758, which issued May 7, 1984, to J. J. Matthias et al, and U.S. Pat. No. 3,975,549, which issued Aug. 17, 1976, to M. A. Shatila et al. Those patents are merely illustrative of the type of dehydrated potatoes that are preferred, and the mention of those two patents should not be construed as limiting in any way the types of starting materials that can be used in the present apparatus and method.

The various sections of the apparatus, and their operation, will be separately described.

Dehydrated Product Bag Storage and Transfer Section

Figure 2:
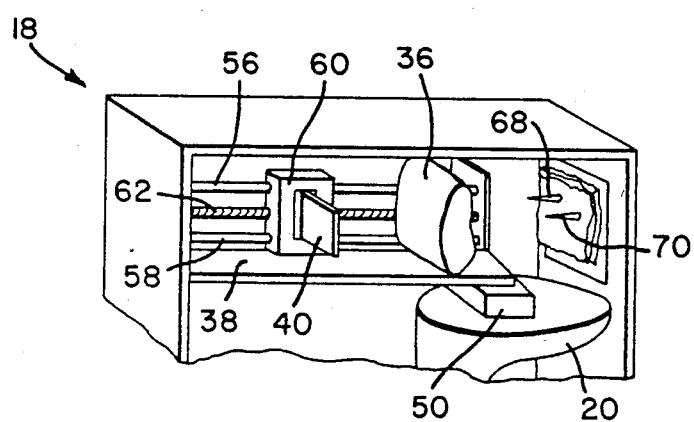
FIG. 2 is a fragmentary perspective view of the top portion of the dispensing machine shown in FIG. 1, and illustrating the raw material storage and transfer apparatus.
Figure 3:
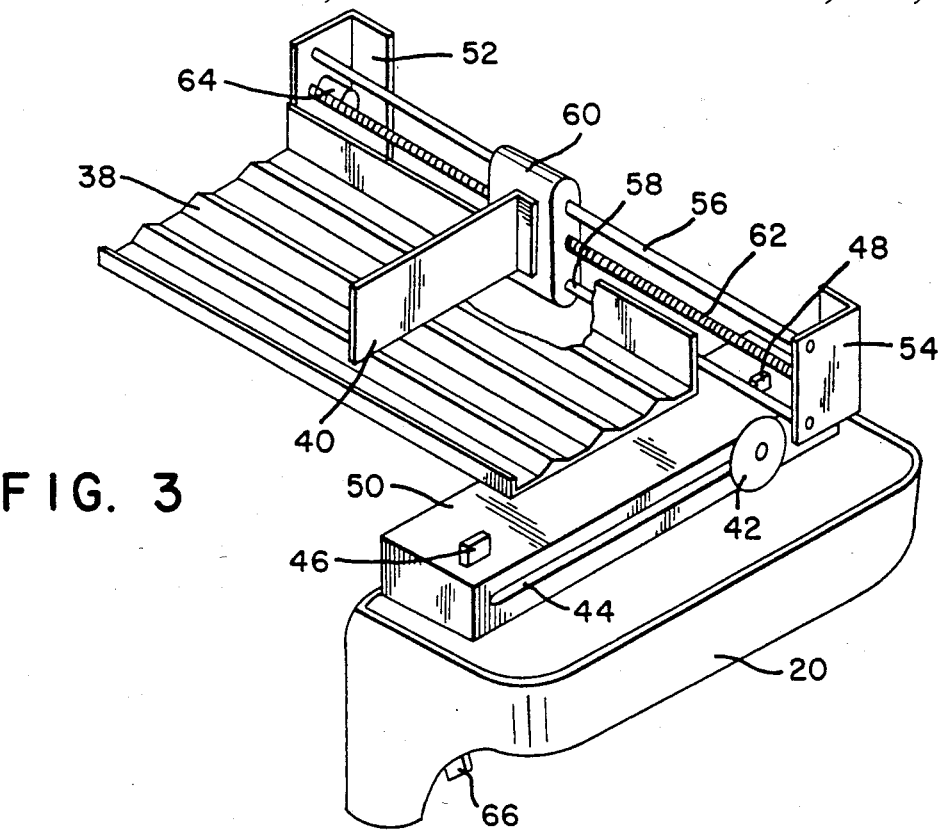
FIG. 3 is another fragmentary perspective view showing a portion of a raw material storage shelf upon which bags of the dehydrated material are stored, feeding means for feeding the bags to a hopper and cutting means for cutting the bags to permit the product to flow into the hopper.

Referring now to FIGS. 2 and 3, there is shown in greater detail the dehydrated product bag storage and transfer section 18 that is provided in the upper portion of the cabinet 12 as illustrated in FIG. 1. The dehydrated potato product is provided in bags 36 that include a kraft paper outer liner and a substantially water-impervious inner liner, such as polyethylene or the like. A plurality of such bags are provided on a shelf 38 and are stacked in front-to-back relationship on their respective longitudinal edges, although only a single bag is shown in FIG. 2 so as not to obscure the bag transfer appartus. A bag pusher arm 40 is provided to urge the bags in the rightward direction toward hopper 20, so that the hopper always contains some amount of dehydrated potato that can be used to prepare an order on demand. The dehydrated potato product, which preferably is in the form of agglomerates, is released from a bag by the passage along the longitudinal edge of the rightmost bag of a rotating cutting wheel 42, best seen in FIG. 3, which passes from one end of the bag to the other to slit it open and thereby permit the dehydrated potato product to fall into hopper 20. Cutting wheel 42 is a rotary cutter that is driven by a motor (not shown) and the cutter motor is moved along a linear slot 44 that extends transversely of the direction of movement of the bags of dehydrated potatoes. Limit switches 46, 48 are provided to sense the extreme positions of cutting wheel 42 and define the outer limits of its path of travel. The limit switches, the cutter drive motor, and the cutter transport motor are carried on or contained within a cutter support housing 50, in which slot 44 is formed.

Shelf 38 extends from cutter support housing 50 to the left end wall of cabinet 12, and a pair of spaced brackets 52, 54 are provided along the innermost edge of shelf 38 and secured to the back wall of cabinet 12. Brackets 52, 54 support a pair of spaced guide rods 56, 58 that extend across the back wall of cabinet 12 and slidably support a pusher support block 60 to which bag pusher arm 40 is secured. Bag pusher arm 40 acts against the endmost of the series of dehydrated potato bags that are carried on shelf 38 and urges them rightward toward the cutting wheel 42 as needed. The operation of bag pusher arm 40 is controlled through a lead screw 62 operated by a lead screw motor 64 that is caused to operate when a low level sensing switc 66h provided in the lower portion of hopper 20 senses a low dehydrated potato product level, whereupon lead screw motor 64 is energized to cause pusher support block 60 to push the bags in a rightward direction, as viewed in FIGS. 2 and 3, so that the rightmost bag overlies cutting wheel 42 so that the bag opening operation can be commenced.

On the inner surface of the right end wall of the cabinet 12, a pair of tines 68, 70 are positioned, the tines extending inwardly of cabinet 12 toward the bags and serving to penetrate the rightmost bag that is pushed into position over cutting wheel 42 in order to hold it stationary and prevent it from moving along with the cutting wheel so that the latter can perform its bag cutting function. The empty bags are forced toward the right as viewed in FIG. 2 by the full bags, and they are retained on the tines in flattened condition for removal during periodic machine servicing. Lead scrw motor 64 is stopped when a full bag is in position over the cutter, either by sensing the position of a bag adjacent the cutter support housing by a suitable sensing switch (not shown), or, alternatively, by sensing an increase in the resistance to further motion of lead screw 62, which is indicative of the fact that a bag is in proper position over the cutting blade and adjacent the end wall of the cabinet.

Dough-Making Section

Figure 4:
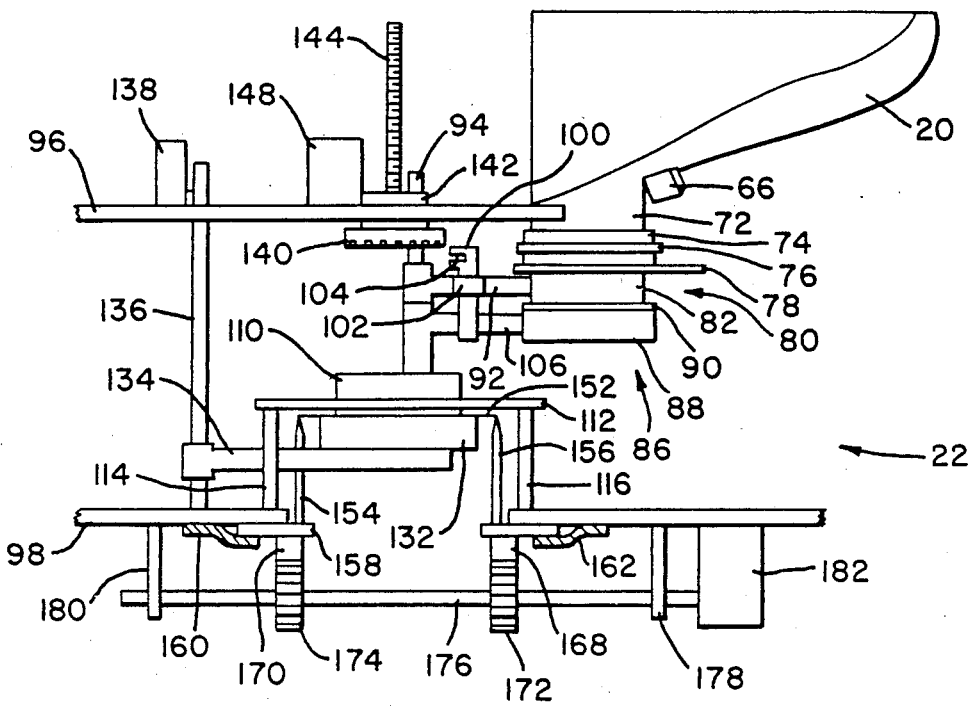
FIG. 4 is a fragmentary front view of the dough-making and rehydration section of the apparatus showing the positions of the parts at the beginning of an operating cycle.
Figure 6:
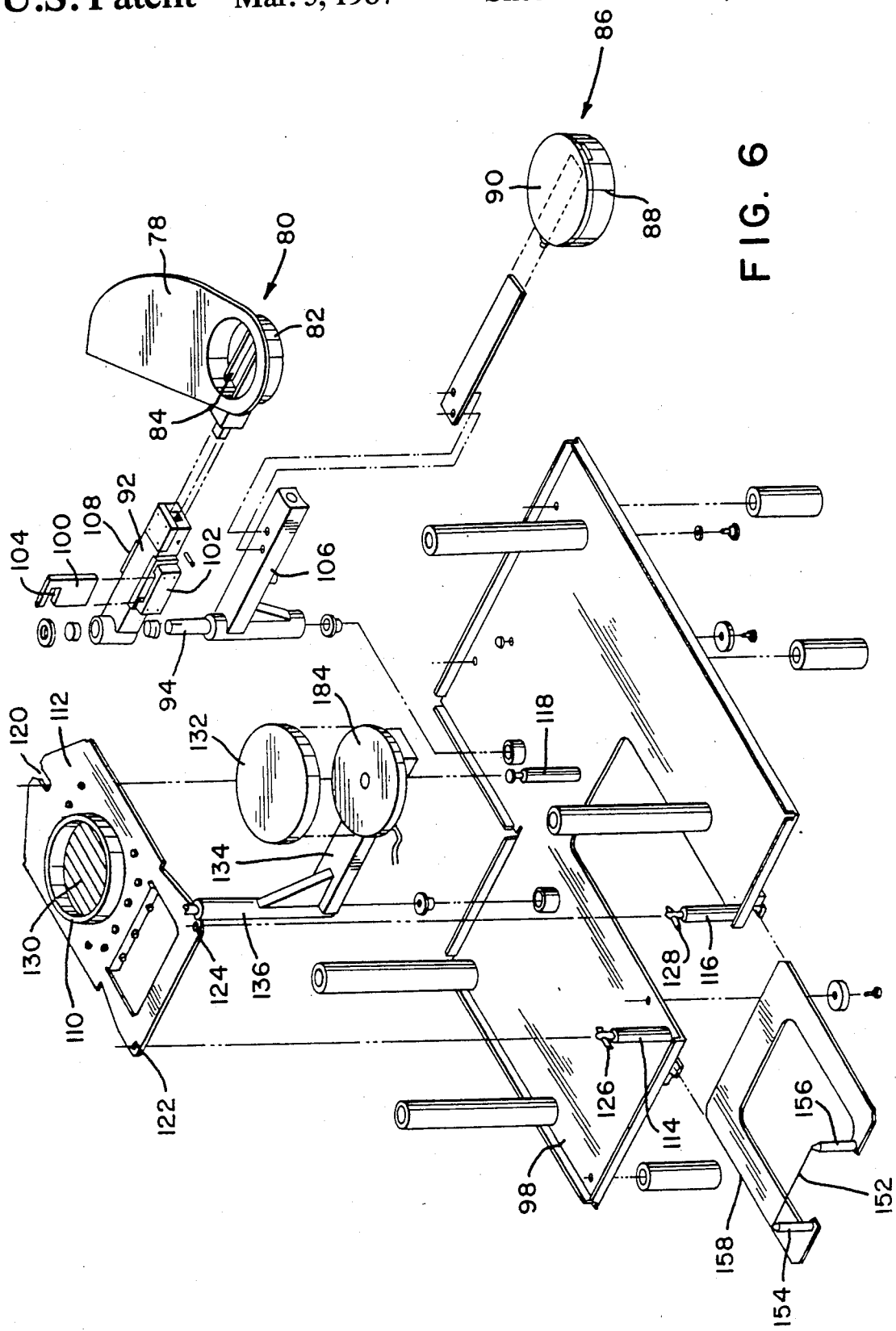
FIG. 6 is an exploded perspective view of a portion of the dough-making and rehydration section of the apparatus showing the relative positioning of the several parts thereof.

Referring now to FIG. 4, hopper 20 includes a tubular outlet 72 at its lowermost portion, and a flexible tubular extension 74 is attached thereto by means of a clamping ring 76. A movable hopper discharge blocking plate 78 is positioned immediately below the open end of flexible extension 74 to prevent the passage of dehydrated potato product therethrough when plate 78 covers the end of extension 74. As best seen in FIG. 6, blocking plate 78 includes a metering chamber 80 in the form of a circular metering ring 82 that is open at the top and bottom, and that includes a plurality of substantially parallel partition members 84 to define separate compartments into which the dehydrated potato material is deposited.

Positioned immediately below metering ring 82 is a rehydration head 86 in the form of a circular disk 88, and includes an imperforate top plate 90 that underlies metering ring 82 to define metering chamber 80. Rehydration head 86 can be a hollow structure which is in communication with a source of water, and having a plurality of discharge apertures substantially uniformly distributed along its lower face. Alternatively, and preferably, the rehydration head is in the form of a sintered metal disk that includes an imperforate peripheral outer portion. The lowermost surface of the disk is provided with a plurality of small uniformly sized and spaced openings through which the water for rehydration can pass to uniformly wet the dehydrated potato product, as will hereinafter be described.

Metering chamber 80 and hopper discharge blocking plate 78 are carried on a metering chamber support arm 92 that extends from and is loosely carried on a rehydration head pivot shaft 94. Pivot shaft 94 extends from and is supported in an upper shelf 96 and a lower shelf 98 for pivoting movement, and metering chamber support arm 92 is in non-driving relationship with pivot shaft 94. Metering chamber support arm 92 includes a latch 100 that is carried in a latch guide 102 for sliding movement in a plane that is parallel to the axis of rehydration head pivot shaft 94. Latch 100 includes a notch 104, the purpose of which will be hereinafter described.

Figure 7:
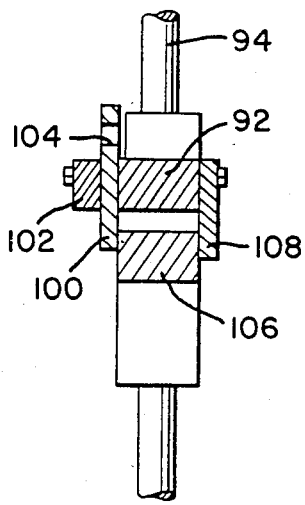
FIG. 7 is a fragmentary cross-sectional view taken along the line 7—7 of FIG. 5 and showing the latching arrangement for causing joint movement of a support arm that carries a metering chamber and a support arm that carries a water distribution or rehydration head.

Rehydration head 86 is carried on a rehydration head support arm 106 that is secured to and pivots with the rehydration head pivot shaft 94. Latch 100 of metering chamber support arm 92 extends downwardly and bears against one side of rehydration support arm 106, as more clearly shown in FIG. 7. As also therein shown, metering chamber support arm 92 also carries a downwardly depending guide plate 108, which bears against the opposite side of rehydration head support arm 106.

Product-Forming Section

Figure 5:
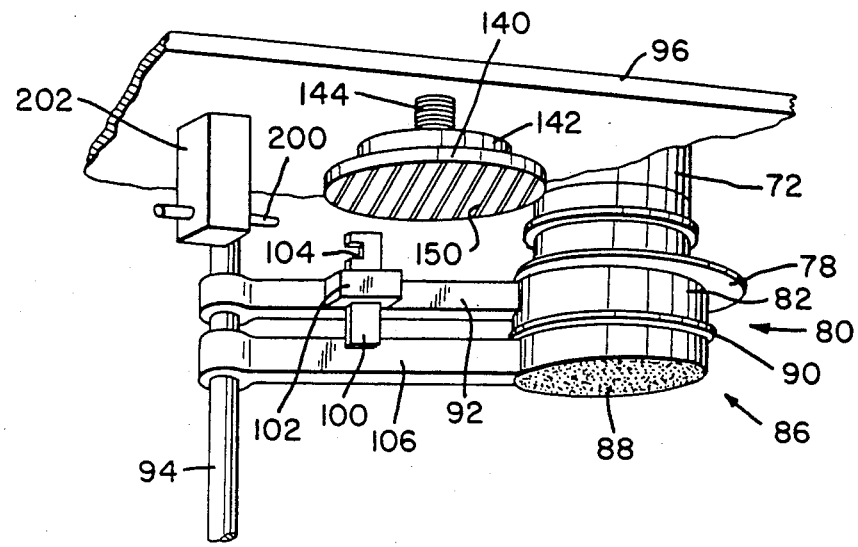
FIG. 5 is a fragmentary perspective view of a portion of the rehydration section of the apparatus looking upward and showing the structure for metering the dehydrated product and the piston that is employed to extrude the dough from a rehydration chamber.

Referring now to FIGS. 4, 5, and 6, product-forming section 22 includes a rehydration chamber 110 that is carried on a rehydration chamber support plate 112 that is supported in spaced relationship between top shelf 96 and bottom shelf 98 of the dough-making section on three support rods 114, 116, and 118. Rehydration chamber support plate 112 includes a notch 120 at one end that is received by innermost support rod 118, and a pair of spaced apertures 122, 124 at its opposite end that are so sized that the plate is supported on ledges defined by shoulders formed in the support rods 114, 116, and 118. The uppermost ends of outer support rods 114, 116 include pivotable retaining tabs 126, 128 to prevent separation of plate 112 from the support rods in a vertical direction. As clearly seen in FIG. 6, rehydration chamber 110 includes a plurality of equally spaced, parallel wire dividers 130 at its lower edge, the position of which is more clearly seen in FIGS. 15 through 17. Wire dividers 130 are preferably thin wires having a thickness of from about 0.020 inches to about 0.040 inches and can be coated with Teflon or other non-stick coatings to minimize dough sticking thereto. Positioned immediately below rehydration chamber 110 is a dough dam 132 that is carried on a dam support arm 134 which, in turn, is secured to and pivots with a dam pivot shaft 136 that is rotatably carried in top and bottom shelves 96, 98. A dam pivot motor 138 is provided to pivot dam support arm 134 at appropriate intervals, and a rehydration head pivot motor (not shown) is provided to separately pivot the rehydration head shaft at appropriate times.

Figure 15:
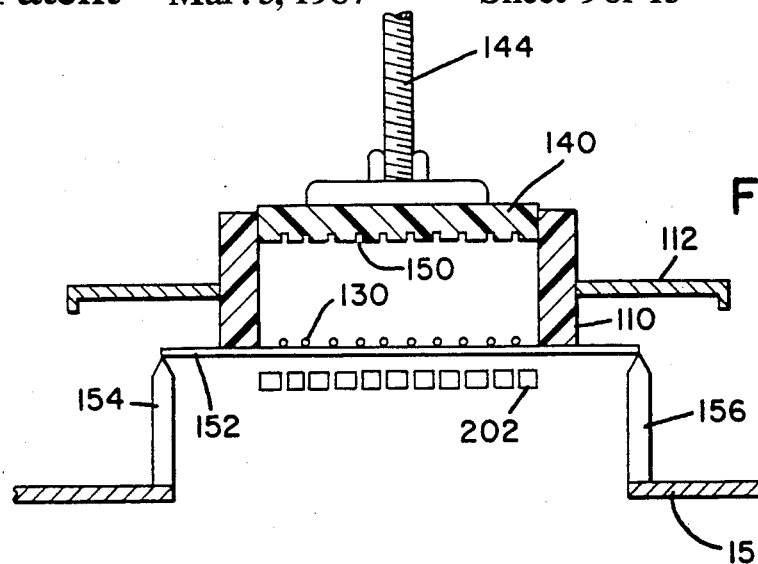
FIG. 15 is a fragmentary cross-sectional view of the rehydration chamber showing the piston after it has descended into the rehydration chamber to extrude dough through the bottom of the rehydration chamber, and the cut dough pieces that have been cut by a cutoff wire.

Positioned above rehydration chamber 110 and spaced therefrom is a piston 140 that is secured to a piston support disk 142 which, in turn, is secured to a piston screw 144. A rotatable nut 146 is provided on screw 144 and rotatably carried in shelf 96. Nut 146 is driven by a piston drive motor 148, to cause piston screw 144 to travel axially and move piston 140 toward and away from rehydration chamber 110. As best seen in FIGS. 5 and 15, the lowermost face of piston 140 includes a plurality of spaced, parallel, transverse slots 150 that have a width and depth that correspond with the diameter of wire dividers 13 in rehydration chamber 110 in order to force from rehydration chamber 110 all of the dough that is contained therein when the piston reaches the lowermost portion of its path of travel. Preferably, piston 140 is made from a plastic material that minimizes sticking thereto of the potato dough, and suitable materials for that purpose include Delrin and Teflon, which are registered trademarks of E.I. DuPont De Nemours Co.

Figure 8:
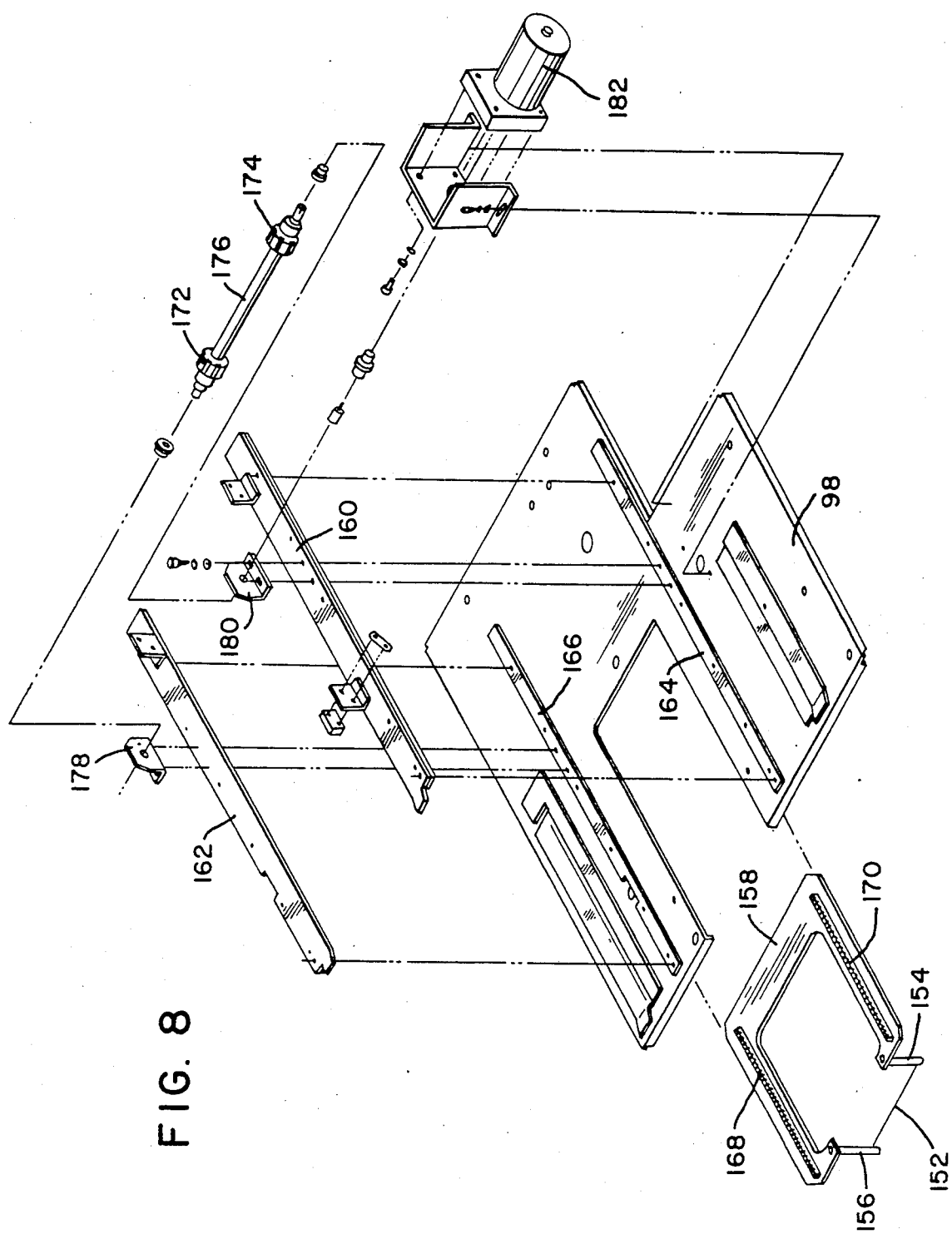
FIG. 8 is an exploded perspective view of the underside of the dough-making and rehydration section showing the structure for supporting and operating the dough cutoff knife.

Positioned below rehydration chamber support plate 112 is a cutoff knife in the form of a cutoff wire 152 that extends across and is adapted to contact the lower surface of rehydration chamber 110. Cutoff wire 152 is supported on a pair of spaced cutoff wire supports 152, 156, which, in turn, are carried on a U-shaped cutoff knife carrier 158, which is best seen in FIGS. 6 and 8. Knife carrier 158 is slidably supported against the lower surface of lower shelf 98 by means of a pair of spaced support plates 160, 162 that define slots along which knife carrier 158 slides. The slots can be provided either by bending support plates 160, 162, to the cross-sectional configuration illustrated in FIG. 4, or, alternatively, by providing spacer plates 164, 166 that space the support plates from the lower surface of the bottom shelf, as illustrated in FIG. 8. Preferably cutoff wire 152 is a wire having a diameter of about 0.041 inches.

Knife carrier 158 is driven linearly in a direction parallel to the direction of wire dividers 130 in rehydration chamber 110. The driving arrangement includes a pair of racks 168, 170 positioned on the lower surface of knife carrier 158, and which engage with a pair of spaced gear 172, 174, respectively, carried on a cutoff knife drive shaft 176 that is rotatably supported on a pair of spaced brackets 178, 180 secured to the lower surface of bottom shelf 98. A cutoff knife drive motor 182 is provided to rotate knife drive shaft 176, and thereby rotate gears 172, 174 that engage racks 168, 170, respectively, on the knife carrier to move the latter rapidly in a linear direction parallel to wire dividers 130.

As best seen in FIG. 6, dam 132 is received on a disk-like dam carrier 184 that is or includes an electrical heating element. The heating element serves to maintain the dam at an elevated temperature, preferably about 180° F., for purposes that will hereinafter be explained. Additionally, the upwardly facing surface of dam 132, which underlies rehydration chamber 110, preferably includes a low-friction coating such as, for example, Teflon, to minimize the friction between the dam and dough that is contained within the rehydration chamber when the dam is moved laterally away from the rehydration chamber.

Figure 19:
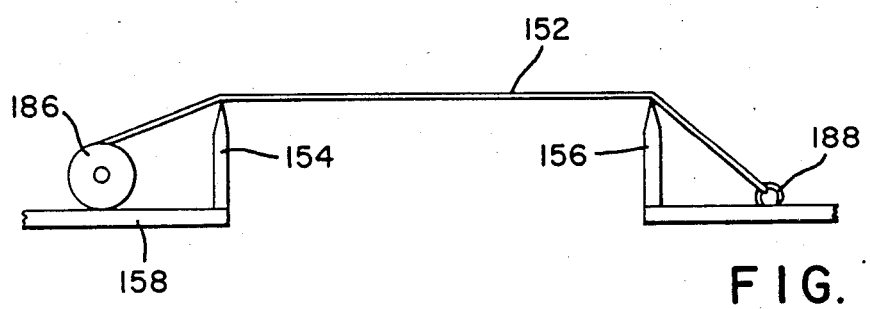
FIG. 19 is a fragmentary view showing an alternative embodiment of the dough cutoff wire wherein the wire is provided in a supply reel to permit rapid repair of the cutoff knife in the event of a break in the wire.

Although the cutoff knife can be formed by securing a cutoff wire 152 to the respective cutoff wire supports 154, 156, as illustrated in FIGS. 4 and 8, cutoff wire 152 can also be provided on a supply reel 186 as illustrated in FIG. 19, wherein one end of cutoff wire 152 is secured to an eyelet 188, or the like, that is carried on cutoff knife carrier 158, with the other end of the wire retained on supply reel 186. That arrangement facilitates the replacement of the cutoff wire in the even of breakage thereof.

Figure 20:
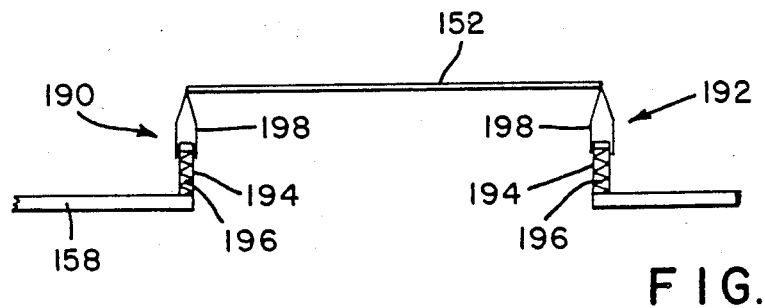
FIG. 20 is a view similar to that of FIG. 19 showing still another embodiment of the dough cutoff knife wherein the cutoff wire is spring-supported to cause it to be urged against the lower edge of the rehydration chamber.

An alternative arrangement for supporting cutoff wire 152 is illustrated in FIG. 20, in which cutoff wire supports 190, 192 each include a lower, hollow wire support guide tube 194 carried by cutoff knife carrier 158, and a spring 196 positioned within each wire support guide tube and bearing against an upper, hollow wire support guide tube 198 that is positioned so as to be movable axially relative to lower guide tubes 194. Springs 196 urge cutoff wire 152 into close engagement with the lower surface of rehydration chamber 110 and with wire dividers 110, and thereby serve to minimize the amount of residual potato dough that remains on wire dividers 130.

Operation of the Dough-Making and Product-Forming Sections

Figure 9:
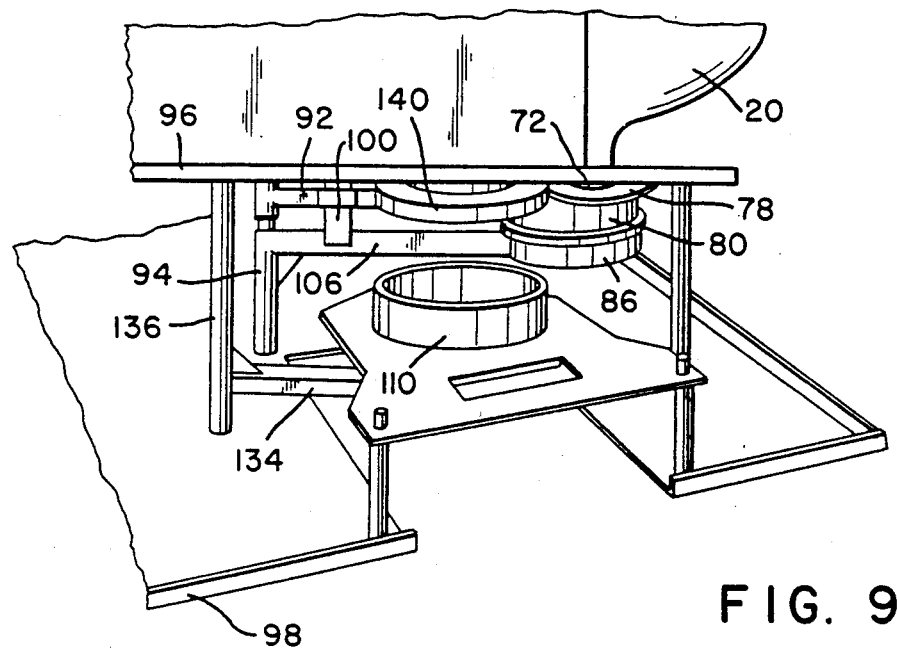
FIG. 9 is a fragmentary perspective view showing the several parts of the dough-making and rehydration section at the time the metering chamber is filled with the dehydrated product.

The several elements of the device are initially in the position illustrated in FIGS. 4 and 9, wherein the metering chamber 80 and rehydration head 86 are adjacent each other in concentric relationship, and underlying the outlet of hopper 20. The product in hopper 20 thus passes through hopper outlet 72, and into metering chamber 80 that is defined by metering ring 82 and top plate 90 of rehydration head 86. The product fills the metering chamber, which is so sized as to provide the desired amount of dehydrated potato product. A motor or other suitable means (not shown) is then activated to pivot rehydration head pivot shaft 94 in a clockwise direction, looking downward, as in FIG. 9, whereupon rehydration head support arm 106 bears against latch 100 to also carry metering chamber support arm 92 with it until metering chamber 80 and rehydration head 86 are in superposed relationship with rehydration chamber 110. As metering chamber 80 moves laterally away from hopper outlet 72, hopper discharge blocking plate 78 bears against flexible extension 76, and prevents further flow of potato product from hopper 20. Flexible extension 76 is provided in order to minimize the grinding action that would otherwise occur if a rigid extension were provided at and in engagement with the blocker plate, which could rupture some of the potato cells and thereby result in a more sticky, and more difficult to handle reconstituted potato dough.

Figure 10:
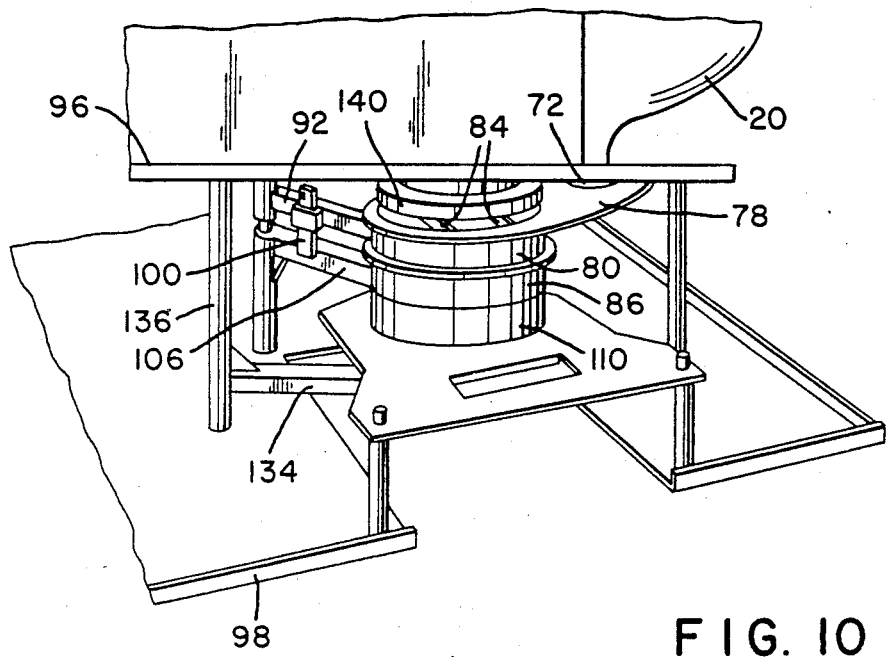
FIG. 10 is a view similar to FIG. 9, but showing the metering chamber and rehydration head after they have been moved into position over the rehydration chamber.

The pivoting of rehydration head 86 and metering chamber 80 terminates when they both overlie rehydration chamber 110 as illustrated in FIG. 10. The arrangement of the particular parts is such that the lowermost surface of rehydration head 86 is in direct contact with the uppermost surface of rehydration chamber 110. Also as illustrated in FIG. 10, dividers 84 in metering chamber 80 serve to retain the dehydrated potato material in a relatively uniform distribution across the metering chamber as the rapid pivoting operation is performed. If dividers 84 were not present, there is a possibility that by virtue of the rapid action, and the inertia of the originally stationary potato particles, that some of the potato granules may spill out of metering chamber 80 and that the main mass of potato particles would lie against one edge of the metering chamber, with the result that there would not be a uniform distribution of the particles, which could lead to nonuniform rehydration.

When rehydration head 86 and metering chamber 80 have reached the position illustrated in FIG. 10, metering chamber 80 is unlatched for rehydration head 86 by means of a latch cam 200 that engages notch 104 in latch 100 and moves it in an upward direction so that the latch no longer is adjacent the side of rehydration head support arm 106. As best seen in FIG. 5, latch cam 200 is supported in position by a latch cam support 202, that is secured to the lower surface of top shelf 96. As metering chamber support arm 92 pivots toward latch cam 200, the cam engages notch 104 and forces latch 100 upwardly so that arm 92 remains stationary relative to arm 106, so that the latter can be separately moved in a clockwise direction, when looking downward, while the former is stationary.

Figure 11:
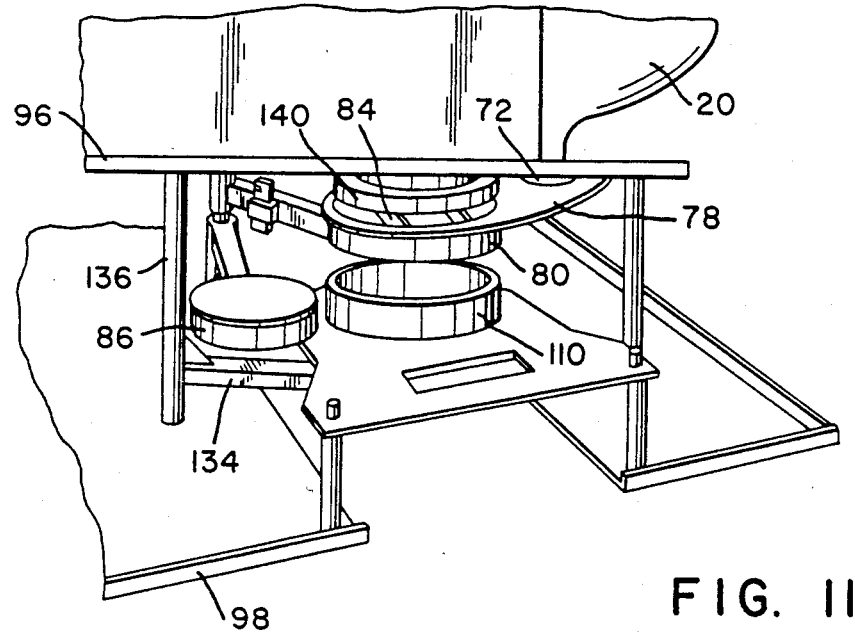
FIG. 11 is a view similar to that of FIG. 10 in which the rehydration head has been moved away from the metering chamber to permit the product to fall from the metering chamber into the rehydration chamber.
Figure 12:
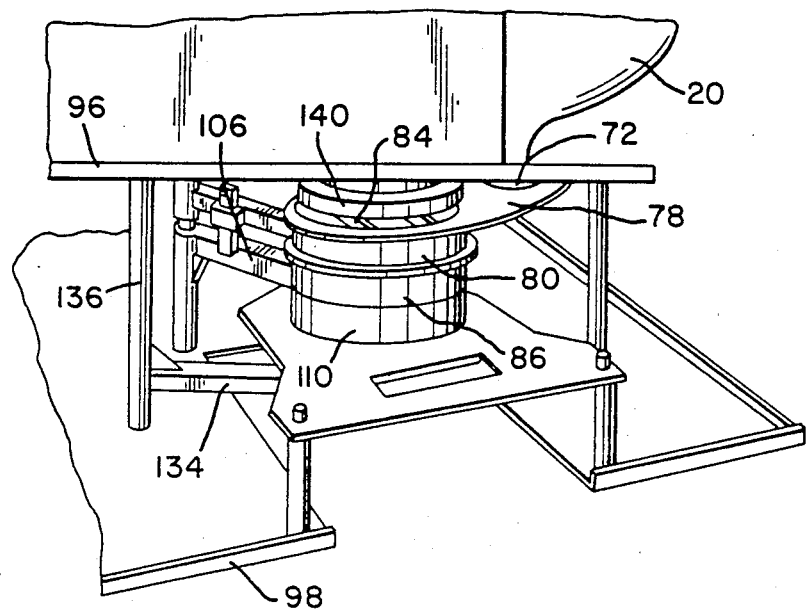
FIG. 12 is a view similar to that of FIG. 11, showing the rehydration head returned to the position illustrated in FIG. 10 below the metering chamber and above the rehydration chamber.

After metering chamber 80 and rehydration head 86 have reached the position shown in FIG. 10, and the metering chamber support arm 92 has been unlatched from the rehydration head support arm 106, the rehydration head pivot shaft 92 is further pivoted in a clockwise direction so that rehydration head 86 moves laterally outwardly from each of metering chamber 80 and rehydration chamber 110, as illustrated in FIG. 11. Consequently, the lower portion of metering chamber 80 is then open, by virtue of the removal of the blocking effect of top plate 90 of rehydration head 86, and the dehydrated potato product contained in metering chamber 80 is permitted to fall into rehydration chamber 110. Thereupon, rehydration head support arm 106 is pivoted in a counterclockwise direction, to return it to a position in which it is underlying metering chamber 80 and overlying rehydration chamber 110, as illustrated in FIG. 12. At that point, heated water (approximately 160° F.) is introduced into rehydration head 86, and by virtue of the plurality of small openings therein, the water is uniformly distributed over the dehydrated potato granules that are in rehydration chamber 110. Because of the nature of the preferred dehydrated potato particles, rapid and uniform rehydration occurs, and a formable dough is provided substantially immediately.

Figure 13:
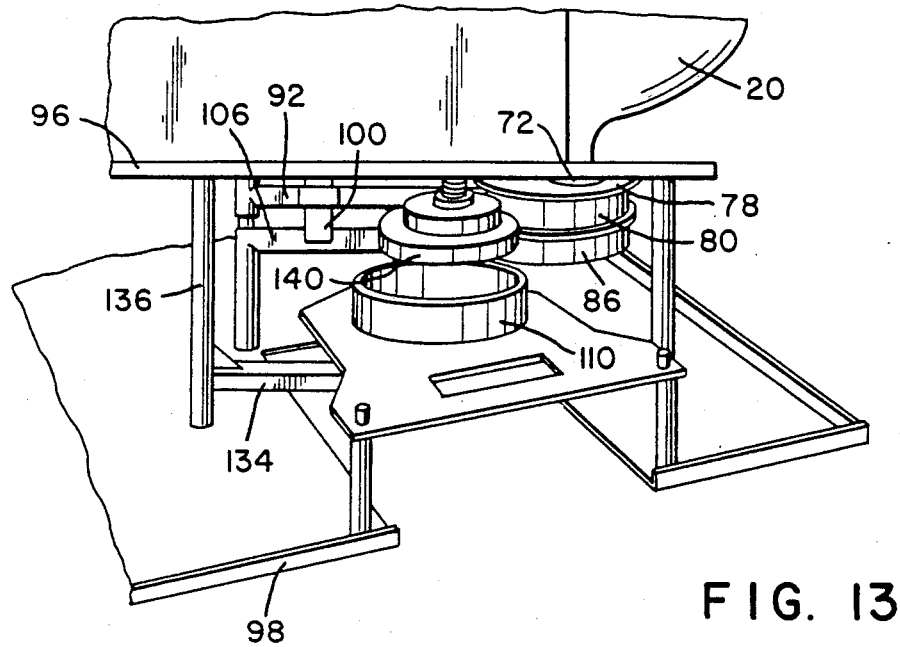
FIG. 13 is a view similar to that of FIG. 12 showing the parts after the metering chamber and rehydration have returned to their original positions, and shows the extrusion piston beginning its descent.

After the potato granules are rehydrated, metering chamber 80 and rehydration head 86 are then pivoted together in a counterclockwise direction to move them away from rehydration chamber 110 so that they again are in underlying relationship with hopper discharge outlet 72, as illustrated in FIG. 13. The conjoint movement of the two support arms results from the presence of guide 108, illustrated in FIG. 7, wherein rehydration support arm 106 bears against guide 108, which is rigidly connected to metering chamber support arm 92 to carry the latter along with it as it moves in the counterclockwise direction.

As metering chamber 80 and rehydration head 86 move together away from rehydration chamber 110, piston 140 begins its descent, as illustrated in FIG. 13. As it descends, the piston is caused to momentarily enter the rehydration chamber to provide a tamping action on the rehydrated potato granules, and thereby further ensure uniform rehydration of the potato granules. After a momentary retraction of the piston after the tamping step, the piston is advanced in a downward direction to cause the resulting reconstituted potato dough to extrude through the lower opening of rehydration chamber 110, whereupon cutoff wire 152 is rapidly moved linearly along the lower surface of rehydration chamber 110 to sever the extruded product from the dough mass that remains within rehydration chamber 110. Because of the presence of dividing wires 130, the cut pieces 202 are of generally rectangular cross section and very closely resemble the usual form of french fried potatoes as they are customarily provided.

Figure 16:
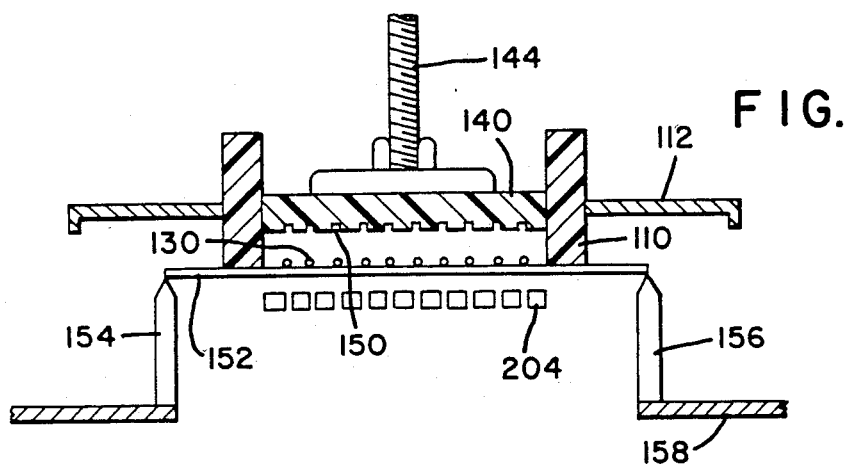
FIG. 16 is a view similar to that of FIG. 15 showing the piston after it has further descended and a second group of cut dough pieces have been cut by the cutoff wire.

The first extrusion step is carried out by moving piston 140 a predetermined first distance, and after the dough is severed, as illustrated in FIG. 15, the piston advances another predetermined increment, as illustrated in FIG. 16, whereupon the cutoff knife is passed along the lower surface of the rehydration chamber once again to sever a second group of dough pieces 204. Successive extrusion and cutting operations can be performed until the desired quantity of product is obtained, and the last extrusion step is illustrated in FIG. 17, wherein the piston has reached the lower point in its path of travel to extrude the remaining portion of the dough through the lower opening of rehydration chamber 110 to define dough pieces 206, and so that respective divider wires 130 engage with and fit within corresponding slots 150 in piston 140 to cause all of the dough contained within rehydration chamber 110 to be expelled therefrom.

Figure 14:
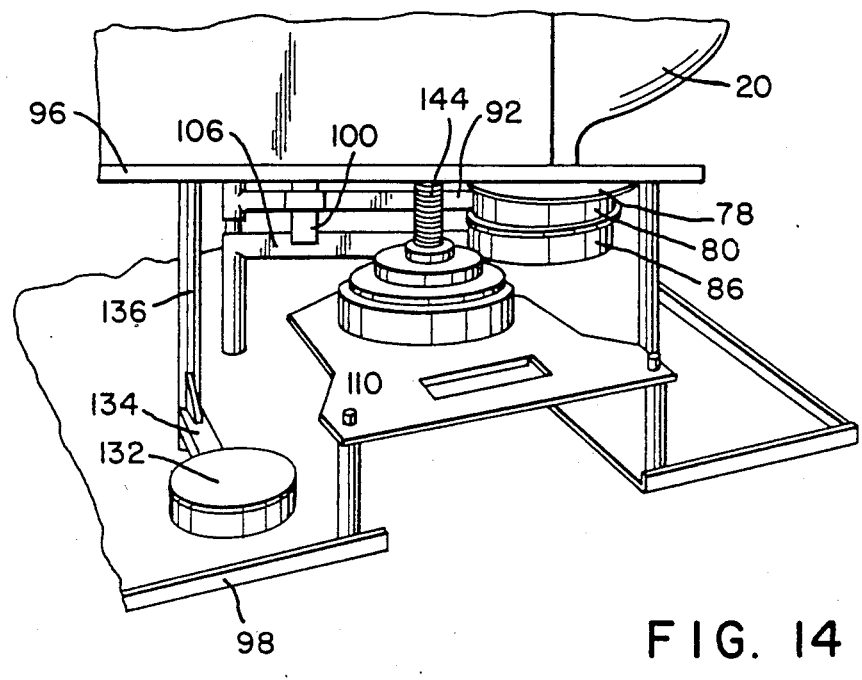
FIG. 14 is a view similar to that of FIG. 13 showing the extrusion piston descending into the rehydration chamber.
Figure 17:
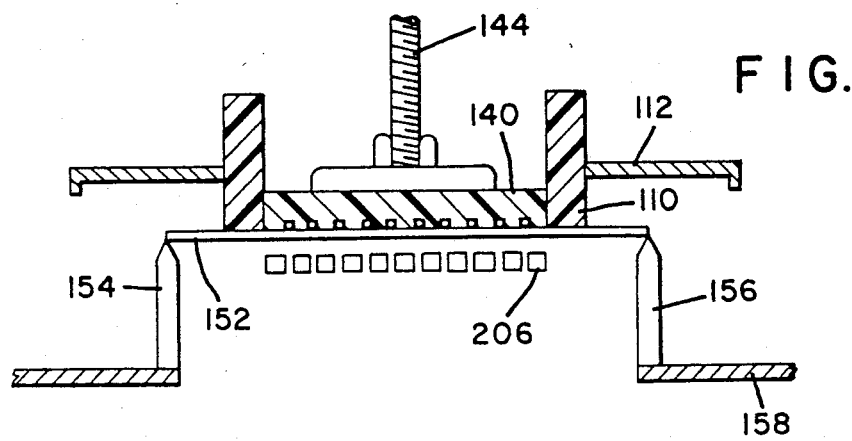
FIG. 17 is a view similar to that of FIG. 16 after the piston has descended an additional distance to the lowermost point of its travel, and the cutoff wire has made a third pass to cut a third group of dough pieces.

During the various extrusion operations illustrated in FIGS. 15 through 17, dam pivot motor 138 has pivoted dam pivot shaft 134 to carry the dam in a counterclockwise direction so that it no longer blocks the lower opening of rehydration chamber 110, as illustrated in FIG. 14.

Product Transfer Section

Figure 18:
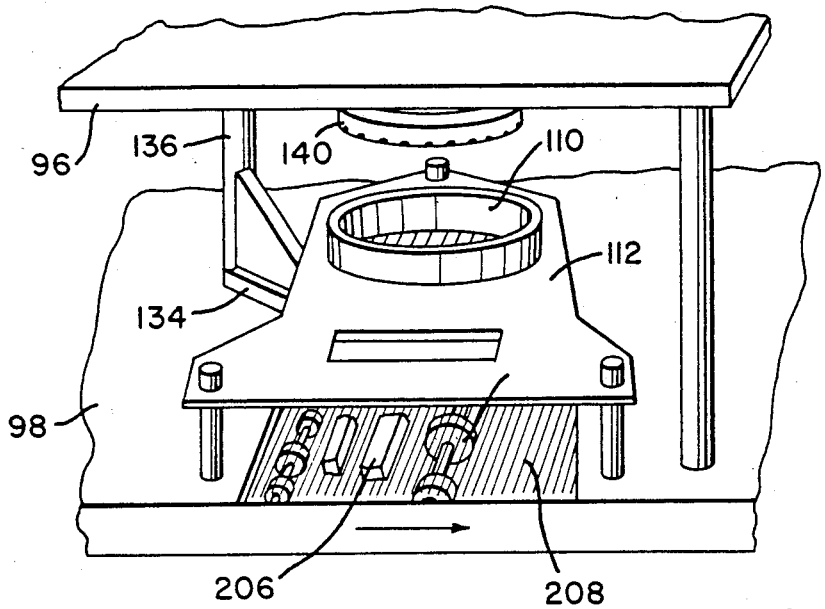
FIG. 18 is a fragmentary perspective view showing the rehydration chamber and the product transfer conveyor that underlies it to carry the cut dough pieces to a fryer.

Referring now to FIG. 18, after the extruded potato pieces 206 have been severed by means of cutting wire 152, they fall downwardly onto a product transfer conveyor 208, which carries them laterally, in the direction indicated by the arrow in FIG. 18, for ultimate transfer to a fryer. The product transfer conveyor can be in the form of a wire conveyor as illustrated, which is driven by a suitable drive motor (not shown) and which is in the form of an endless belt that passes over a plurality of rollers 210 carried on parallel roller shafts 212, 214, and 216 (see FIG. 21). Product transfer conveyor 208 preferably moves continuously during the dough-cutting operation so that each respective group of cut potato pieces is carried on a separate portion of the belt and is spaced from the previous and following groups of cut potato pieces in order that the cut pieces travel individually and are not in contact with each other. In that connection, it is highly desired that the dough be extruded in a vertical direction, so that the cut pieces fall vertically without bending. Bending could result if extrusion were accomplished in a horizontal direction, which would result in unnatural-looking potato pieces.

The size of the wires that form the dividers 130 in rehydration chamber 110 is preferably about 0.020 inches in diameter, although wires within the range of from about 0.020 inches to about 0.040 inches can also be used if desired. However, if the divider wires are too small in diameter, insufficient separation between adjacent potato pieces can result, which may cause the cut pieces to contact each other and perhaps stick to each other, which, again, is an undesirable condition. If the divider wires are too large in diameter, on the other hand, excessive buildup of potato dough residue can take place in the piston grooves and around the outer surfaces of the wires which, although tolerable, is not preferred. Further, dam 132 is maintained at an elevated temperature of approximately 180° F., to provide sufficient heat to dry out any residual potato dough that may remain on rehydration chamber 110 or on divider wires 130, in order to improve sanitation by minimizing the likelihood of bacterial contamination due to the presence of moisture.

Although shown in FIG. 18 as being a series of wires arranged transversely to the direction of movement of the conveyor, product transfer conveyor 208 can also be formed from a smooth, solid material, because no drainage apertures are required at this particular stage of the process. Suitable materials could also include synthetic rubber, or various base materials containing Teflon or other non-stick coatings. Additionally, it is also preferred that the diameter of the respective belt drive pulleys, or turning means, at the downstream end of the product transfer conveyor be as small as possible, preferably about 0.25 inches or less, in order to provide an abrupt edge and change of direction to facilitate separation between the cut potato piece and conveyor 208, and to minimize the possibility that a potato piece will stick to the belt while the belt passes around and beneath the respective guide rollers. Another alternative for facilitating separation is the positioning of a doctor blade 218 at the discharge end of the product transfer conveyor, as illustrated schematically in FIG. 22.

Frying and Dispensing Section

Figure 21:
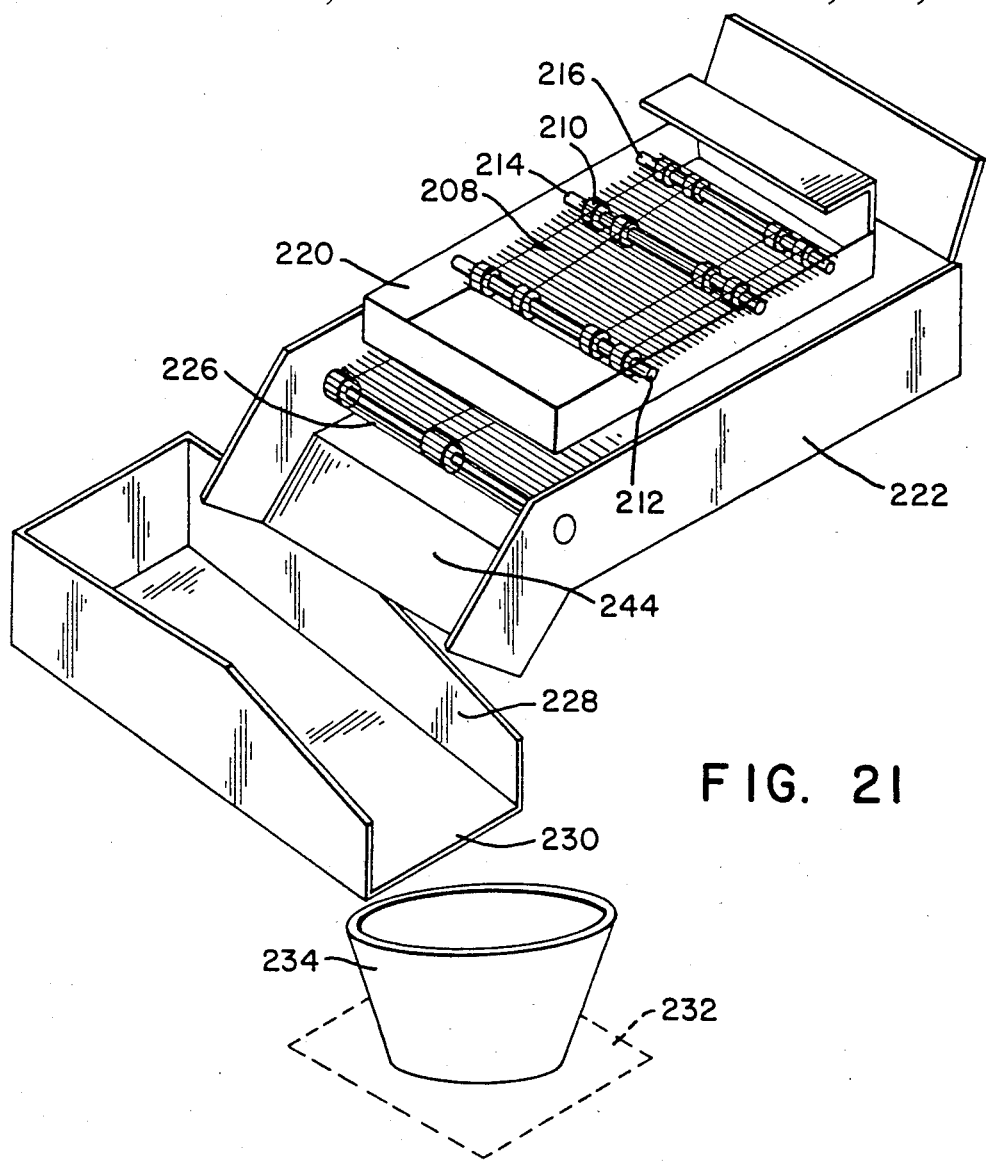
FIG. 21 is a fragmentary perspective view showing the product transfer conveyor in position above a fryer, with a product discharge trough and a product container in position to receive the final product.
Figure 22:
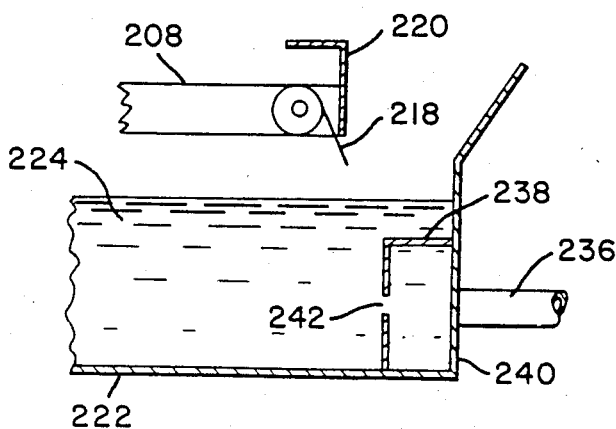
FIG. 22 is a fragmentary side elevational view through the oil inlet end of the fryer vessel showing the position of the product transfer conveyor and of an oil discharge slot, relative to the oil level in the fryer.

Referring now to FIGS. 21 and 22, product transfer conveyor 208 is supported in a frame 220, which overlies a fryer vessel 222, within which hot frying oil 224 is provided. As the potato pieces fall from product transfer conveyor 208 into the frying oil, they are fried and then carried from fryer vessel 222 by means of a product discharge conveyor 226 positioned at the outlet end of fryer vessel 222. Thereafter they fall from product discharge conveyor 226 into a discharge trough 228, which has an outlet end 230 adjacent a dispensing opening provided in the outer surface of the cabinet door (not shown). Preferably a platform 232 is provided in a recess formed in the door and a product cup is placed on platform 232 to receive the fried potato product as it passes from outlet 230 of discharge trough 228.

As shown in FIG. 22, fryer vessel 222 is filled with hot frying oil 224, which is provided through an oil inlet tube 236. Oil inlet tube 236 opens into an oil inlet plenum chamber, which extends across the end wall 240 of fryer vessel 222 and which incudes a pair of oil discharge slots 242 (see FIGS. 22 and 23) to discharge the hot oil substantially uniformly across the width of fryer pan vessel 222. Oil discharge slots 242 also cause the hot oil to flow into fryer vessel 222 at a relatively high velocity to cause the surrounding oil to be entrained and carried along the base of fryer vessel 222 toward fryer outlet 244, which aids in transporting the potato pieces toward the fryer outlet as they are being fried.

Figure 23:
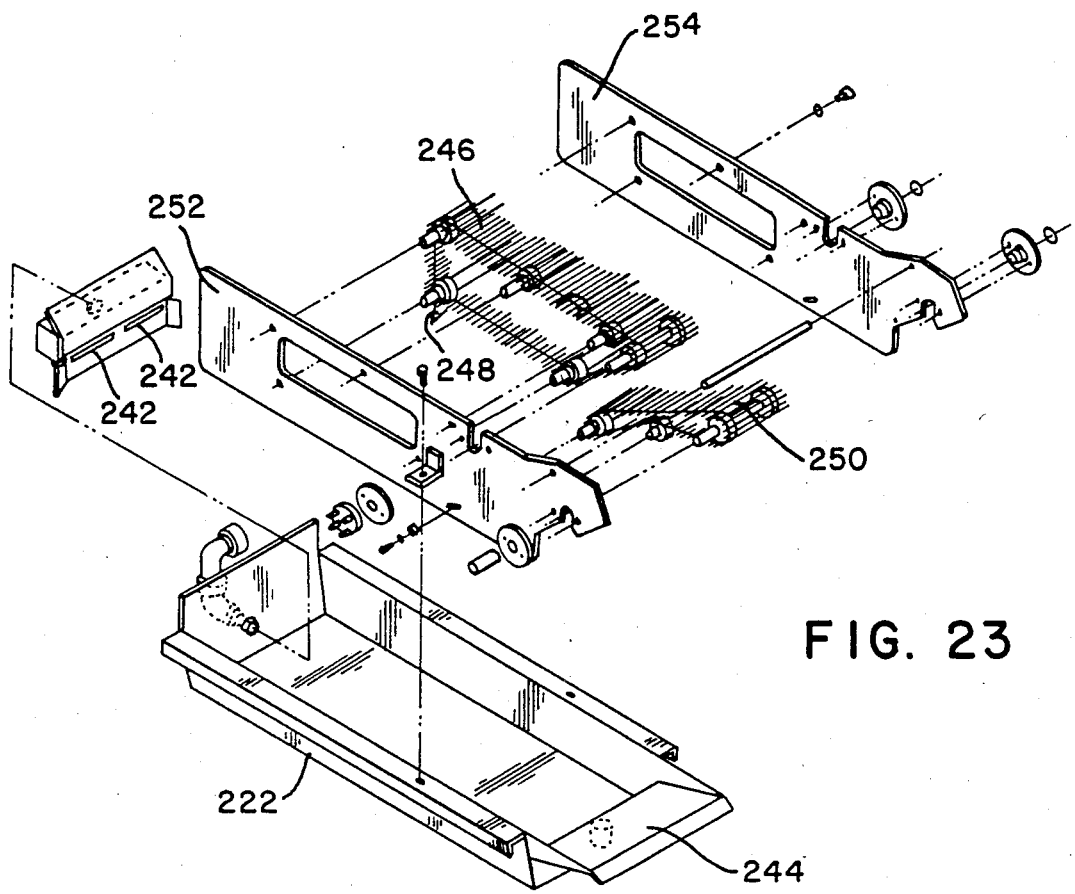
FIG. 23 is an exploded perspective view of the fryer vessel and its associated parts and more clearly showing the product transport conveyor and the product discharge conveyor.

As shown in FIG. 23, fryer vessel 222 includes a product transfer conveyor 246 that includes laterally and longitudinally spaced carrier arms 248 that extend downwardly into the frying oil to aid in moving the potato pieces along fryer vessel 222 toward fryer outlet 244. Additionally, fryer vessel 222 also includes a product discharge conveyor 250, which carries the fried potato products out of the frying oil and to fryer outlet 244. Each of product transport conveyor 246 and product discharge conveyor 250 is supported on a pair of support plates 252, 254 that are secured to the longitudinal walls of fryer vessel 222. Product transport conveyor 246 and product discharge conveyor 250 can each be driven by independent motors (not shown) to provide the desired residence time of the potato pieces during the frying operation, and, additionally, to rapidly convey the completed fried potatoes in a short time span to define a single serving that is dispensed in a product cup.

Figure 24:
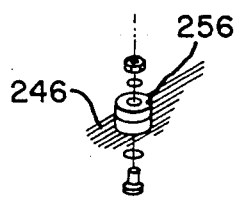
FIG. 24 is a fragmentary exploded perspective view showing the positioning of magnet disks on the product transfer conveyor to permit the sensing of the position of predetermined portions of the transport conveyor.

Preferably, product transport conveyor 246 includes one or more magnet disks 256 as illustrated in FIG. 24, which are positioned in a predetermined relationship relative to carrier arms 248 so that the discharge into fryer vessel 222 of potato pieces from product transfer conveyor 208 can be timed in order that product transport conveyor 246 operates so as to have a single serving of the product carried between sets of respective longitudinally spaced pairs of carrier arms 248 in order to prevent mixing of individual servings. The position of the magnet disks can be sensed by a suitable magnetic sensor (not shown). The fryer vessel and product transport conveyor are so sized that three individual servings can be fried simultaneously.

Frying Oil Heating and Transfer System

Figure 25:
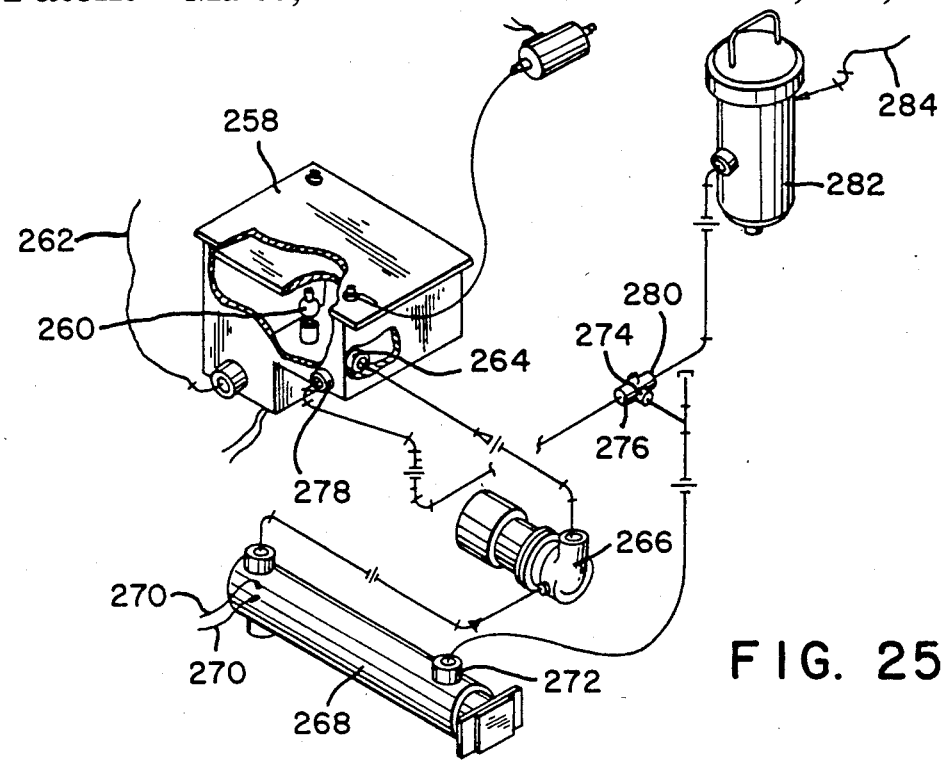
FIG. 25 is a schematic view showing the several parts of the frying oil heating and transfer apparatus.

Referring now to FIG. 25, an oil storage tank 258 for heated frying oil is provided, the tank having a float switch 260 to sense a low frying oil level and to permit introduction of additional frying oil from a frying oil supply reservoir (not shown) through a suitable conduit 262. Tank 258 includes an outlet 264 that is in communication with a frying oil circulation pump 266 which draws the oil from tank 258 and conveys it to a heat exchanger 268. The heat exchanger includes an internally positioned heating element (not shown) connected to leads 270 of a suitable power supply (not shown) for maintaining the frying oil at a desired temperature level, preferably from about 380° F. to about 385° F. Heat exchanger 268 includes an outlet 272 that is in communication with an oil flow control valve 274, which is a motor-operated valve, which includes a first outlet 276 that is in communication with a second inlet 278 to tank 258, and which includes a second outlet 280 that is in communication with a frying oil filter 282. The filter includes an outlet that is connected by a conduit 284 with fryer vessel inlet 236.

The oil system is in continuous operation to the extent that the heat exchanger maintains the oil in the storage tank at the desired temperature level in order to permit the immediate commencement of a frying operation. When the machine is in operation, oil is provided to the fryer vessel as necessary to maintain the desired frying oil level and temperature, and when the machine is not in operation, the oil control valve is placed in the position to prevent flow of heated oil to the fryer pan and to direct the oil back to the storage tank. The heating element within the heat exchanger is thermostatically controlled so as not to heat the oil to excessively high levels, and to sense when the oil has cooled to a predetermined level, whereupon the heating of the oil is initiated to maintain it at the desired temperature. Additionally, suitable temperature sensing means (not shown) are provided on the fryer pan to sense the temperature thereof, and periodically the oil flow control valve is opened to permit hot flying oil to pass through and out of the fryer vessel and thereby maintain it at an elevated temperature so that the apparatus is ready for a dispensing cycle and does not require an excessively long warm-up time. By maintaining the fryer vessel at a high temperature, the oil that is introduced when a serving of fried potatoes is to be prepared is not rapidly cooled, which would cause an insufficiently heated and browned product to result, which is undesirable. Additionally, although not shown in the drawings, the oil circulation system preferably also includes a frying oil filter to filter any potato particles or frying residue that may exist in the frying oil. Further, the air exhaust system 32 illustrated in general in FIG. 1, includes a suction fan to create a negative draft over the frying vessel to exhaust oil fumes and the steam that is given off by the frying potato pieces. The air cleaning system preferably includes a grease trap and suitable filters to remove undesirable materials, and thereafter exhaust the air at the rear portion of the machine.

Cup Storage and Transfer Section

Figure 26:
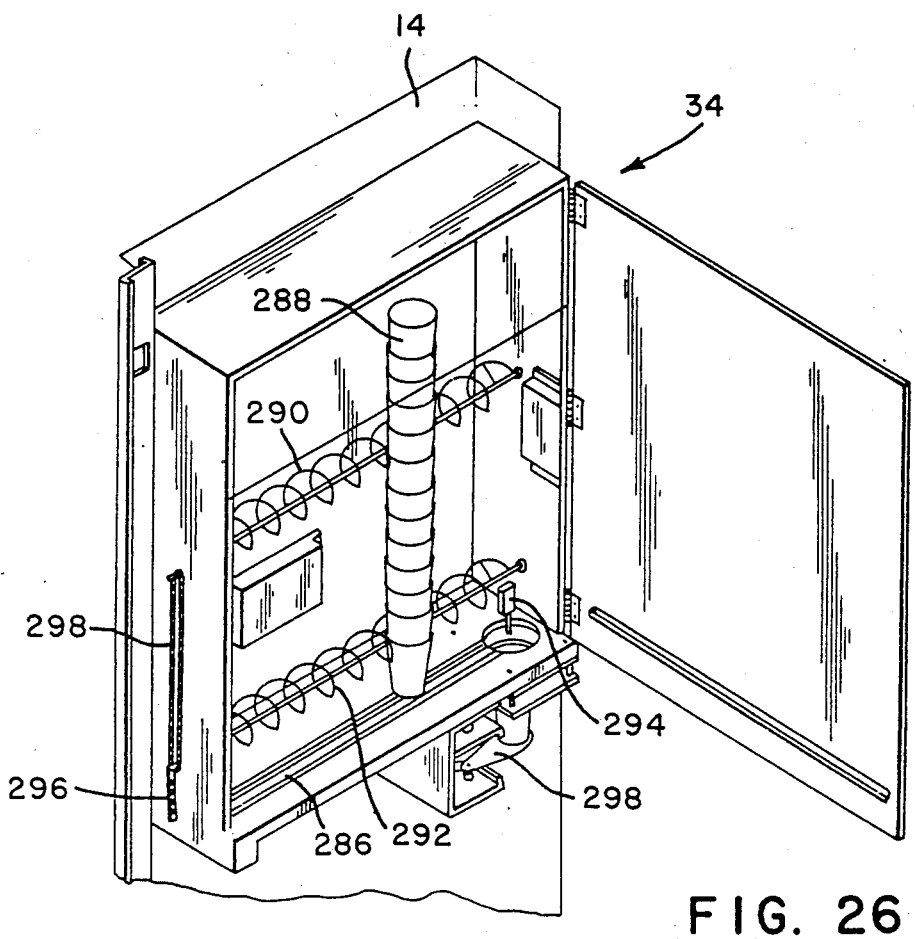
FIG. 26 is a fragmentary perspective view of a portion of the inside of the door of a dispensing machine showing the cup storage and transfer apparatus for cup-type containers into which the product is deposited for dispensing purposes.

As shown in FIG. 26, the inner surface of the housing door 14 includes a cup storage and dispensing section 34 that has a storage shelf 286 upon which a plurality of stacks 288 of cups can be positioned. The dispensing section includes a pair of transversely arranged spaced helical feed coils 290, 292 that are adapted to engage the respective cup stacks. Upon a suitable signal generated by cup sensing switch 294, a motor (not shown) to drive the drive chain 246 and the connecting chain 298 to cause helical feed coils 290, 292 to feed cup stacks 288 in the direction toward a dispensing opening. Positioned beneath the dispensing opening is a cup dispenser apparatus 296 and a pivotable cup platform 298. The structural details and the method of operation of a suitable cup dispensing apparatus is shown and described in co-pending application Ser. No. 728,523, entitled, "Cup Dispensing Apparatus" and filed concurrently herewith.

The apparatus and method as hereinabove described and as illustrated in the appended drawings can be utilized either in an institutional setting in which french fried potatoes are one of the food items distributed in such as, for example, industrial cafeterias, fast food restaurants, and the like, or, alternatively, the machine can be utilized as a vending machine to provide individual servings of french fried potatoes at places where vending machines are normally found such as, for example, schools, industrial plants, offices, and the like. When used as a vending machine the device will, of course, require suitable coin equipment to control its operation, but such equipment is well known to those skilled in the art and is not further described herein.

In its operation, the apparatus and method hereinabove described can provide a ready-to-eat serving in about a minute, assuming a frying time of approximately fifty seconds. Further, the method and apparatus hereinabove described have been found to provide a product that very closely resembles french fried raw potatoes in appearance, texture, and taste.

Although particular embodiments of the present invention have been illustrated and described, it will be apparent to those skilled in the art that changes and modifications can be made without departing from the spirit of the present invention, and it is intended to encompass in the appended claims all such changes and modifications that fall within the scope of the present invention.

What is claimed is:

1. Apparatus for preparing hot food products in portions of predetermined size by rehydrating a dehydrated food product to provide a dough that can be shaped and heated, said apparatus comprising:
   (a) dehydrated food product hopper means for storing a predetermined quantity of dehydrated food product, said hopper means having an inlet and an outlet;
   (b) raw material storage and transfer means for storing a plurality of prepackaged quantities of a dehydrated food product and for transferring individual packages of the food product to said product hopper means as needed to maintain a part of the stored dehydrated food product ready for immediate use;
   (c) rehydration means for receiving a measured quantity of dehydrated food product from said raw material storage and transfer means and for rehydrating the measured quantity of dehydrated food product without agitation of a mixture of the dehydrated food product and water to provide a coherent dough;
   (d) forming means for forming the dough into predetermined shaped dough pieces, said forming means including a dough-receiving chamber having an open top and an open bottom, said open bottom including a plurality of parallel, substantially equally spaced members, and piston means movable within said dough-receiving chamber to urge the contents thereof through said open bottom to cause said product to extrude vertically downwardly from said chamber into separate pieces defined by said divider members, said piston means including a slotted face having slots corresponding in size and orientation to the size and orientation of said divider members to prevent retention of dough between said divider members when said piston slots contact and engage with said divider members; and (e) heating means to heat the formed dough pieces to provide a heated food product having a desirable texture, taste, and appearance.

2. The apparatus of claim 1 wherein said raw material storage and transfer means includes hopper means for retaining a sufficient quantity of dehydrated product to provide a desired number of portions of heated rehydrated product;

storage means for storing a plurality of packages containing the dehydrated food product;

cutting means adjacent the hopper means for cutting the packages so that the contents of cut packages fall into the top of the hopper means; and conveying means for sequentially conveying individual packages from said storage means to said cutting means.

3. The apparatus of claim 2 wherein said raw material storage and transfer means includes shelf means and said conveying means includes pusher means to push the packages along said shelf means to said cutting means.

4. The apparatus of claim 2 wherein said cutting means includes a rotary knife positioned above the hopper means, and means to move the rotary knife against a lower part of a package to cut through the package and permit the contents thereof to fall into the hopper.

5. The apparatus of claim 2 including retaining means for retaining a plurality of empty cut packages outside the hopper means after the contents of the respective packages has been deposited in the hopper means.

6. The apparatus of claim 5 wherein said retaining means includes time means that extend across the inlet of said hopper means for receiving and holding the packages that are conveyed to said cutting means.

7. The apparatus of claim 2 including sensing means positioned in said hopper means for sensing the level of dehydrated food product in said hopper means and for generating a signal to activate said conveying means when the level of dehydrated food product in the hopper reaches a predetermined level.

8. The apparatus of claim 1 wherein said rehydration means includes:

(a) metering chamber means to receive a predetermined amount of dehydrated food product, said metering chamber means being movable from a fill station to a rehydration station and including a ring member having an open top and an open bottom;

(b) rehydration head means including an imperforate top plate that underlies said metering chamber means to close the open bottom thereof, said rehydration head means movable from a fill station to a rehydration station;

(c) actuating means for moving said rehydration head means from said fill station to said rehydration station;

(d) water supply means for providing water to said rehydration head means; and (e) latch means for coupling said rehydration head means to said metering chamber means to cause said metering chamber means to move with said rehydration head means to and from said fill station and to and from said rehydration station.

9. The apparatus of claim 8 including release means for releasing said latch means to permit said rehydration head means to move beyond said rehydration station while said metering chamber means remains at said rehydration station.

10. The apparatus of claim 8 wherein said rehydration head means includes a porous metal base member underlying said imperforate top wall and having a porous bottom surface and an imperforate side surface to permit uniform distribution of water from said porous bottom surface.

11. The apparatus of claim 8 wherein said actuating means includes a pivotable shaft, first arm means extending from said rehydration head means and secured to said shaft to couple said rehydration head means to said shaft, second arm means extending from said metering chamber means and loosely carried by said shaft, and said latch means includes a latch carried by said metering chamber arm means and engageable with said rehydration head arm means to couple each of said arm means for conjoint movement thereof.

12. The apparatus of claim 9 wherein said latch release means includes cam means spaced from said actuating means and engageable with said latch means to move said latch means away from said rehydration head means when said actuating means has moved said rehydration head means to said rehydration station.

13. The apparatus of claim 1 wherein said forming means includes dam means in underlying relationship to said dough-receiving chamber and having a dam surface to define a bottom wall of said chamber, and means for moving said dam means laterally of said chamber to open the bottom thereof and permit the passage of dough therethrough.

14. The apparatus of claim 13 wherein said dam surface includes a low friction coating to prevent sticking of dough thereto.

15. The apparatus of claim 13 wherein said dam means includes heating means to heat said dam surface to a predetermined temperature.

16. The apparatus of claim 13 wherein said forming means includes a cutoff knife in underlying relationship to said chamber open bottom, and means for rapidly moving said cutoff knife linearly across and in contacting relationship with said chamber open bottom to sever dough that is extruded therefrom by said piston, the movement of said cutoff knife being in the same direction as the direction in which said spaced divider members extend.

17. The apparatus of claim 16 wherein said cutoff knife is a thin wire that extends linearly across said chamber open bottom and is supported on a pair of spaced wire supports each of which is positioned on opposite sides of said chamber.

18. The apparatus of claim 17 wherein said cutoff wire has a diameter of about 0.040 inches.

19. The apparatus of claim 17 wherein said wire supports include spring means to urge said wire into closely contacting relationship with said chamber open bottom.

20. The apparatus of claim 17 wherein said cutoff knife includes a wire supply reel and a wire retaining means spaced therefrom, and said wire extends from said supply reel over said wire supports to said wire retaining means.

21. The apparatus of claim 1 wherein said forming means includes product transfer conveyor means for transferring said shaped dough pieces to said heating means.

22. The apparatus of claim 21 wherein said product transfer conveyor means includess an endless conveyor belt, and belt roller means to support said belt, said belt having a product discharge end including belt turning means over which said belt passes and which changes the direction of movement of said belt, wherein said belt turning means has a radius of curvature of about ¼ inch.

23. The apparatus of claim 21 including doctor blade means positioned at the product discharge end of said conveyor belt and having blade edge means adjacent said belt to separate the product from said belt as it passes around the belt turning means.

24. The apparatus of claim 1 wherein said heating means includes a fryer vessel for receiving heated frying oil into which said shaped dough pieces are deposited, said fryer vessel including a bottom wall, a pair of opposed side walls, a rear wall, and a front wall, said fryer vessel including product transport conveyor means for transporting the dough pieces through the frying oil, and product discharge conveyor means for conveying fried dough pieces from the frying oil to a fried product discharge.

25. The apparatus of claim 24 wherein said fryer vessel includes means for providing a flowing current of frying oil that flows toward the fried product discharge to move the dough pieces along the fryer.

26. The apparatus of claim 25 wherein said fryer vessel includes a frying oil inlet at one end thereof, and means defining a plenum chamber at said frying oil inlet, said plenum chamber including openings facing an opposite end of said frying vessel.

27. The apparatus of claim 24 including a closed loop oil circulating system having an oil storage tank means, heat exchanger means for heating said frying oil to a predetermined temperature, pump means to transfer said oil from said tank means to said heat exchanger means, and diverter valve means to selectively divert heated frying oil to said tank means and to said fryer vessel.

28. The apparatus of claim 27 including filter means positioned between said diverter valve means and said fryer vessel to filter the frying oil before it enters the fryer vessel.

29. The apparatus of claim 27 including means responsive to the temperature of said fryer vessel and operable to periodically activate said diverter valve to periodically divert hot frying oil to said fryer vessel to maintain the fryer vessel in a heated condition between frying operations.

30. The apparatus of claim 1 including product container storage and dispensing means operable to present individual product containers to received predetermined quantities of the heated food product.

* * * * *